A United States Patent [19]

Fisher et al.

[11] Patent Number: 4,497,663
[45] Date of Patent: Feb. 5, 1985

[54] METHOD OF ENCAPSULATING A POLLUTING LIQUID

[75] Inventors: Robert G. Fisher, Beckenham; Ian G. Meldrum, Leatherhead; Alan J. Plomer, London; Richard A. Robinson, Camberley, all of England

[73] Assignee: The British Petroleum Company Limited, London, England

[21] Appl. No.: 615,720

[22] Filed: May 30, 1984

Related U.S. Application Data

[63] Continuation of Ser. No. 356,512, Mar. 9, 1982, abandoned, and a continuation of Ser. No. 161,385, Jun. 20, 1980, abandoned.

[30] Foreign Application Priority Data

Jun. 26, 1979 [GB] United Kingdom ................. 7922248

[51] Int. Cl.$^3$ ............................ C02F 1/40; B08B 7/00; F16L 55/18
[52] U.S. Cl. ......................................... 134/4; 137/15; 138/92; 138/97; 210/727; 210/732; 210/734; 210/735; 210/751; 210/925; 264/4.7; 264/36; 405/53; 405/154

[58] Field of Search ...................... 134/4; 137/15, 315; 138/92, 97, 98, 99; 264/36, 4.7; 405/52, 53, 154; 210/727, 728, 725, 734, 732, 733, 735, 736, 751, 925

[56] References Cited

U.S. PATENT DOCUMENTS

| | | | |
|---|---|---|---|
| 3,367,869 | 2/1968 | Silver | 252/35 |
| 3,415,745 | 12/1968 | Isaacson | 210/925 |
| 3,544,609 | 12/1970 | Forbes | 260/429.9 |
| 3,577,515 | 5/1971 | Vandegaer | 264/4.7 |
| 3,718,445 | 2/1973 | Troffin | 524/100 |
| 3,869,385 | 3/1975 | Stanley | 210/925 |
| 3,919,083 | 11/1975 | O'Sullivan | 210/925 |
| 4,011,159 | 3/1977 | Stein | 134/4 |
| 4,206,080 | 6/1980 | Sato | 210/925 |
| 4,230,566 | 10/1980 | Faudree | 210/925 |
| 4,244,895 | 1/1981 | Nakashin | 138/97 |
| 4,296,932 | 10/1981 | Grobler | 138/97 |

Primary Examiner—Ernest G. Therkorn
Attorney, Agent, or Firm—Morgan, Finnegan, Pine, Foley & Lee

[57] ABSTRACT

A method for forming a three-dimensional network containing encapsulated organic material comprises reacting a functionalized polymer and a complementary functional cross-linking agent in the presence of the organic material. The method may be used for recovering oil spilled on sea or land, for treating organic wastes or preventing leakage of oil from tanks or pipelines.

30 Claims, No Drawings

METHOD OF ENCAPSULATING A POLLUTING LIQUID

This is a continuation of application Ser. No. 356,512 filed Mar. 9, 1982 and U.S. Ser. No. 161,385 filed June 20, 1980, both now abandoned.

The present invention relates to a method for cross-linking functionalised polymers, especially in the presence of organic materials such as crude oil or petroleum fractions, hereinafter referred to as oil.

The invention is also concerned with the polymers themselves and their precursors, and with uses of the polymers and the method.

The invention is particularly suitable for encapsulating organic materials to render them tractable or innocuous and has particular suitability for dealing with oil spillages on sea or on land. Cross-linking of the polymer precursors takes place in the presence of the organic material so that a relatively solid, handleable substance is formed from which the organic material does not readily separate.

In recent years occurrences of oil spillage at sea have increased and numerous proposals have been made for dealing with such events. These fall into two main categories: (a) concentration and recovery of the oil, and (b) dispersal of the oil.

In order to concentrate the oil, booms may be deployed to trap it and cause it to accumulate within the confines of a limited space from which it may be removed by mechanical skimmers or by flowing over weirs in the booms into discharge tubes.

In order to disperse the oil, it is sprayed with a detergent composition and the mixture is then violently agitated.

Both types of recoveries can be effective when dealing with mobile liquids such as freshly split crude oil or light to medium petroleum products. If, however, the pollutant is a heavy fuel oil or a crude which has been allowed to weather and lose its lighter components and/or form a thick "chocolate mousse", the problem of recovery becomes much greater since such materials cannot be skimmed or dispersed.

Furthermore, if oil escapes and drifts ashore, problems of a different nature occur. On a sandy beach the oil permeates the sand and can be removed only by the expedient of digging up the sand and perhaps burning off the oil. On a rocky shore the oil adheres tenaciously to the rocks and requires high pressure water hoses or laborious scrubbing to effect even partial removal.

Other instances in which the escape of oil gives rise to severe problems are to be found in storage and transportation, e.g. in leakage from tanks or pipelines, or in spillage from road or rail tankers.

Other potential uses of the invention includes the encapsulation of hazardous organic wastes, e.g. halogenated hydrocarbons, organo-phosphates, silicones, benzene and inflammable or toxic liquids generally, to reduce the hazard and the pollution risk.

The containment of oil spills by forming a gel has been previously proposed. For example, U.S. Pat. No. 3,869,385 proposes applying an isocyanate and an amine to the oil to form a gel. However, in practice effective gel formation is not easy to achieve for the following reasons:

(i) for most effective encapsulation the components forming the gel have to be dispersed throughout the oil, i.e. they have to be miscible with it. Most preferably the components should be soluble in oil;

(ii) the cross-linking reaction has to occur fairly rapidly in air and in relatively inhospitable conditions, e.g. temperatures not above ambient and possibly in the presence of sea water, sand, rock, etc.;

(iii) the polymer should be able to encapsulate a large quantity of oil otherwise the treatment cost may become prohibitive;

(iv) the resulting polymer containing encapsulated oil has to be relatively stable so that it can be easily collected;

(v) the components and the polymer should be non-toxic otherwise the hazard and pollution may be made worse rather than better.

We have now discovered that certain functionalised polymers can be cross-linked to form rubbery gels which fulfil the above mentioned requirements.

According to the present invention a method for cross-linking a functionalised polymer in the presence of organic material comprises reacting a liquid polymer which is miscible with the organic material and which contains functional groups with a cross-linking agent which is also miscible with the organic material and which contains complementary functional groups and allowing a three-dimensional polymer network containing encapsulated organic material to form.

The present invention includes a two-pack composition comprising, in one pack, a liquid polymer miscible with organic material and containing functional groups and in the other pack a cross-linking agent also miscible with the organic material and containing complementary functional groups, the components being capable, on mixing in the presence of organic material, of forming a three-dimensional polymer network containing encapsulated organic material.

The functional groups and complementary functional groups may be respectively carboxylic acid, anhydride, or acid chloride groups and amine, or alcohol groups. Preferably the carboxylic acid, anhydride or acid chloride groups are on the liquid polymer and the amine or alcohol groups on the cross-linking agent, but the reverse situation may also apply.

The functional groups on the polymer and cross-linking agent may be mono- or poly-functional. There should be at least two functional groups per molecule on both the polymer and the cross-linking agent to allow a three-dimensional network to form.

When the functional group is an amino group, this may be added as such in the form of a suitable amine or in the form of a compound which forms an amine in situ. Thus the compound may be a ketimine which is readily hydrolysed in the presence of water to a ketone and a primary amine.

The term "liquid polymer" means a material which is liquid at ambient temperature and it preferably is a liquid with a viscosity of not more than 20 poise at 25° C. It may consist solely of a liquid polymer or it may be a solution or dispersion of a polymer in a suitable solvent or diluent.

The term "miscible with organic material" means that the polymer and cross-linking agent can be dispersed through, and are preferably soluble in, the organic material. In the case of polymers or cross-linking agents which are not miscible per se, miscibility may be conferred by dispersing or dissolving the polymer or cross-linking agent in a diluent or solvent which is itself miscible with the organic material. For convenience, the remainder of this specification will be described with reference to soluble polymers and cross-linking agents.

The polymer may be any polymer capable of being functionalised. It is preferably a polyolefin and more particularly a polymer of a mono- or di-olefin containing, before functionalisation, at least one and preferably a plurality of pendant vinyl groups.

The polyolefins may be derived in known manner from conjugated dienes such as butadiene, isoprene and chloroprene and mono-olefins such as isobutene and 4-methylpentene-1.

Suitable polymers may also be obtained from linear mono-olefins such as ethylene and/or propylene; acrylates and methacrylates having sufficiently long chains to give oil solubility; and substituted styrenes such as t-butyl styrene.

Polymers derived from naturally occurring substances may also be used, provided they can be functionalised, e.g. linseed or soya bean oil and natural rubber.

The molecular weight of the polymer may vary widely depending on its type and may range from 250 (e.g. linseed oil) to $1 \times 10^6$ or more (e.g. natural rubber) with intermediate values for synthetic polymers (e.g. 5000–20,000 MW for maleinised polybutadiene and 200,000 to 500,000 for maleinised polyisoprene.

The polymers may be functionalised by the incorporation of carboxylic acid, anhydride or acid chloride groups by known techniques. Convenient methods are maleinisation across double bonds in the polymer or copolymerisation with a reactant containing the required functional groups. Similarly, alcohol or amine groups may be incorporated by known techniques.

The extent of functionalisation will depend on the number of sites (e.g. double bonds) which can readily be functionalised or, in the case of copolymerisation, the proportion of reactants. The extent of functionalisation may thus vary widely depending on the type of polymer and may range from 1% (e.g. natural rubber) to 50% (e.g. linseed oil). Preferably the extent of functionalisation is from 1 to 15% by weight.

There may be residual unsaturation remaining after functionalisation without affecting the formation of a three-dimensional network. Preferably however the functionalised polymer is substantially saturated to increase storage life and improve miscibility with the organic material. The functionalised polymer may be hydrogenated, if necessary, to achieve this.

The term "polymer" included copolymers and from the above discussion it will be seen that a number of factors have to be balanced to give the optimum functionalised polymer. Desirably, the functionalised polymer has a long chain with minimum branching between functional groups to give a three-dimensional network with maximum encapsulation capacity. The polymer, before functionalisation, desirably therefore has well spaced out residual unsaturated groups which can be functionalised. The overall molecular weight may thus be relatively high, but this has to be balanced against the fact that relatively large amounts of solvent may be needed to give a liquid polymer as herein defined. Since the solvent will be encapsulated in the three-dimensional network formed, this may reduce the capacity for encapsulating the desired organic material.

Preferred polymers may thus be maleinised polybutadiene, polyisoprene, EPDM rubber or natural rubber. Maleinised polybutadienes having a molecular weight of from 5000–20,000 are commercially available, e.g. those sold under the trade name 'Lithene' by Revertex Limited.

An important aspect of the present invention is the choice of cross-linking agent. Although it is generally known that polymers containing acid or anhydride or acid chloride groups can be cross-linked with amines or alcohols, many of the usual cross-linking agents are unsuitable for use in the present invention because of lack of solubility in organic materials particularly oil, and/or because of a slow curing rate at ambient temperature.

In general, suitable cross-linking agents include di or poly-functional compounds having amine and/or alcohol groups. Thus they may be hydrocarbyl amines, e.g. primary mono-amines, polyamines such as the polyalkylene polyamines (diethylene triamine, triethylene tatramine, tetraethylene pentamine, etc.) amino alcohols, e.g. diethanolamine and triethanolamine. Polyols, e.g. pentane-1,4-diol and dihydroxy-polybutadienes, may give cross-linking which may be accelerated to some extent by the presence of an amine.

The cross-linking agent may be rendered soluble in organic material, particularly oil, in the following ways:

(i) Insoluble cross-linking agent of the amine or amino-alcohol type may be solubilised by complexing with neutral or basic metal carboxylates. The metal ion may be any metal ion which forms neutral or basic carboxylates, but for convenience it should be a cheap, readily available and non-toxic ion. Thus preferred carboxylates are the neutral or basic carboxylates of the metals of Group II of the Periodic Table, e.g. calcium, magnesium or zinc. Suitable solubilising agents are thus basic sinc salts of general formula $(RCOO)_6Zn_4O$, wherein R is an alkyl, cycloakyl, aryl, aralkyl or alkaryl group, disclosed in British Patent Specification No. 1142195. The four zinc atoms are believed to be arranged tetrahedrally around a central oxygen atom with the six carboxylic groups joining the zinc atoms and forming the six edges of the tetrahedron. Amine complexes of these zinc salts are disclosed in British Patent Specification No. 1198060. Basic magnesium and cadmium salts similar to the zinc salts may also be formed, and these metals also form neutral salts. The carboxylic acids may conveniently have from 5 to 25 carbon atoms and may be, for example, versatic, oleic or stearic acids. The cross-linking agent and the solubilising agent may be present in a molar ratio in the range 1:1 to 8:1, preferably about 4:1 for basic salts and 1:1 to 4:1 for neutral salts.

(ii) Insoluble cross-linking agents of the amine, amino-alcohol or polyol type may be solubilised by including in the compound a large hydrocarbyl group. This hydrocarbyl group may be any group capable of reacting with or being multi-functionalised by amine or alcohol groups.

Examples of cross-linking agents of this type are the dihydroxy polybutadienes mentioned above and the hydrocarbyl polyamines proposed for use as carburettor detergents and/or lubricant additives. The hydrocarbyl group may be a polyisobutylene (e.g. polyisobutylenes sold under the registered trade mark 'Hyvis' by BP Chemicals Limited) and the amines or amino-alcohols may be any of those indicated above. Examples of suitable compounds are those disclosed in UK Patent Specification Nos. 1004411, 1094020, 1386620, 1403248 and 1405305.

The size of the hydrocarbyl group should be sufficient to solubilise the cross-linking agent and the group is preferably of at least 8 carbon atoms. The preferred upper limit depends on practical considerations since increasing the molecular weight will in effect increase the weight of cross-linking agent required and also increase its viscosity and ease of handling.

(iii) As an alternative to chemical solubilisation, an insoluble cross-linking agent may be dispersed or dissolved in a diluent or solvent which is itself soluble in the organic material. Thus insoluble low molecular weight amines or amino-alcohols may be dissolved in an organic solvent, e.g. an ester. Alternatively they may be used in the form of emulsions in a hydrocarbon diluent, e.g. micro-emulsions such as are described in co-pending European Patent Application No. 79301536.3.

Preferably the functionalised polymer and the cross-linking agent are added in a molar ration of 3:1 to 1:3, based on the molar ratio of functional groups in the polymer and agent, most preferably about stoichiometric.

As previously described, the functionalised polymer may be dissolved or dispersed in a suitable solvent or diluent and so may the cross-linking agent. Suitable solvents may be hydrocarbon solvents (e.g. naptha, white spirit, kerosine, gas oil or toluene or other organic solvents, e.g. ketones, ethers and esters). For cleaning up oil spills and for other uses it may be desirable to use a solvent of low toxicity, e.g. a de-aromatised kerosine or gas oil such as are currently used as solvents for oil slick dispersants.

An important aspect is that the polymer and cross-linking agent should both be of a viscosity which encourages ready mixing and which allows the components to be applied by conventional techniques, e.g. spraying. Suitably viscosities for both the functionalised polymer and the cross-linking agent may by up to 20 poise at 25° C.

It will be apparent that the present invention may be used in a wide variety of situations and for encapsulating a variety of organic materials. For example, there may be situations where the organic material is at a temperature above ambient, or where rapid formation of a three-dimensional network is not essential, and the invention may not necessarily be used in the presence of water. Nevertheless, for the invention to have wide applicability and for compositions sold to be utilisable in almost any situation the following requirements are desirable:

(i) The cross-linking should be capable of occurring at temperatures not above ambient, e.g. at temperatures below 15° C. and preferably at temperatures as low as −10° C.

(ii) The cross-linking to form a three-dimensional network should occur relatively rapidly, e.g. that a three-dimensional network should form in not more than 1 hour.

(iii) The functionalised polymer and cross-linking agent should be water-insoluble so that the components are not lost when used in the presence of water.

(iv) The cross-linked polymer has the capability of encapsulating at least its own weight of organic material and preferably at least three times its own weight. The amount of functionalised polymer used may be from 0.1–30% wt of the organic material, preferably from 1–25% wt with suitable corresponding amounts of the cross-linking agent.

The polymer containing encapsulated material is desirably sufficiently solid to be capable of being handled by conventional solids handling equipment, e.g. in the case of oil spills on water that the polymer can be recovered with nets and in general that that the polymer can be stored and transported in conventional solids containers.

The organic material to be encapsulated may be solid or liquid, preferably the latter, and may be any material in which the functionalised polymer and cross-linking agent are dispersible and preferably in which they are soluble. Preferred organic materials are hydrocarbons and particularly, as indicated earlier, oil.

One particularly important embodiment of this invention thus lies in the treatment of oil spilled on land or water.

Thus, according to this aspect of the present invention, there is provided a method for gelling oil which method comprises mixing a functionalised polymer as hereinbefore described with a cross-linking agent as hereinbefore described in the presence of oil and allowing a rubbery gel containing cross-linked polymer and oil to form.

When dealing with oil spills on water, a water soluble cross-linking agent, or one which could be rendered water soluble by the presence of surfactants, is less suitable since this would quickly transfer to the aqueous phase and be lost to the system.

The composition of the solvent is important in this case. A non-toxic material low in aromatic content should be used, e.g. a de-aromatised kerosine or gas oil.

When treating an oil spill the quantity of functionalised polymer added may be in the range 1 to 25% wt by weight of the oil, preferably 2 to 15%.

Technically it is better if the functionalised polymer and the cross-linking agent are consecutively added to the spill, but this demands two separate spraying operations which may not be desirable or feasible under the emergency conditions of an oil spillage. In practice, the polymer and the cross-linking agent may be sprayed simultaneously from twin nozzles or mixed immediately before use and the mixture sprayed on to the spill.

If the spill is a light or medium petroleum fraction or freshly spilt crude oil, the natural diffusion mechanism, perhaps enhanced by wave motion, may be sufficient to ensure adequate mixing without further agitation. If not, mixing will be necessary. This can be achieved by known methods such as churning by ships' propellers or towing a breaker board through the spill.

The polymer and cross-linking agent are also capable of gelling heavy fuel oils and mousse which cannot easily be recovered by conventional systems. In this case, artificial agitation to ensure proper mixing is necessary if complete gellation is to be achieved. The methods mentioned above may be suitable.

Once the gel is forming, any increase in moderate agitation, e.g. from wave motion, tends to increase the mixing of the polmer and the cross-linking agent into the slick and hence improve formation of the gel.

A tough, flexible, rubbery, non-adhesive but self-cohesive masss quickly forms which can be recovered, e.g. with nets, or allowed to drift ashore where it can easily be recovered without contaminating the shore line.

Although the above description has been concentrated on the recovery of oil at sea, it will be appreciated that the same principles can be applied to the recovery of oil from rivers and from inland areas of water, either natural or artificial.

They can also be applied to accumulations of oil on solid surfaces generally, e.g. on beaches or rocks, on roads, floors, garage forecourts and refinery or oil storage areas. The gel formed by the present invention may be removed as a mat or large lumps.

The invention also has utility in stopping leaks in oil storage or transport facilities on land or in or under water, the aim being to form a gel in the vicinity of the leak. When oil is flowing at high speed or is under high pressure, additional steps may be necessary to ensure that the gel formed is not carried away by the flow and is maintained in the vicinity of the leak. However, even when a leaking pipeline is shut down and the oil flow stopped, there may be additional pollution from leakage of the possibly large amount of residual oil remaining in the line. Injection of functionalised polymer and cross-linking agent into the pipeline near the leak to form, for example, two plugs of gel on either side of the leak, may prevent further leakage until such time as more permanent remedies can be applied.

The invention may also have utility for converting hazardous organic wastes, particularly liquid wastes, to a less hazardous and more easily handled solid form.

From the above description of uses it will be seen that the invention is of particular utility for the collection and disposal of organic wastes and spills. However, the polymer containing encapsulated organic material may have some value of itself even when the encapsulated material is waste or spilled material. The present invention therefore includes a three-dimensional solid polymer containing encapsulated organic material as hereinbefore described.

The polymer may, for example, be useful as a material for land farming. Alternatively, the encapsulated organic material may be useful in its own right.

If disposal is required, the oil containing polymer may be burnt in a suitable incinerator (e.g. one designed for burning scrap rubber). Alternatively the oil-containing polymer can be liquefied by treatment with steam or by mechanical shearing and the liquefied oil burnt or used for land farming.

This invention is illustrated with reference to the following examples.

EXAMPLE 1

Sufficient Iranian heavy crude oil (700 ml) was poured into a glass tank containing sea water to form an oil layer 1 cm thick. 140 g of a 50% by weight solution in toluene of maleinised polybutadiene was poured into the tank and gently mixed into the oil layer by hand. The polybutadiene was sold under the trade name 'Lithene N-4 9000' by Revertex Limited (9000 being the molecular weight) and was maleinised to 7½ wt.

On completion of the mixing, 23 g of a 50% by weight solution in toluene of a complex of basic zinc versatate and diethanolamine in the stoichiometric molar ratio of 1:4 was poured into the oil/polymer layer and again mixed by hand. Versatic acid is a commercially available $C_9$–$C_{11}$ branched tertiary carboxylic acid sold by Shell International Chemical Company Limited. 'VERSATIC' is a registered trade mark. The complex had the formulation:

$$Zn_4O(R-COO)_6.4NH(CH_2CH_2OH)_2$$

where

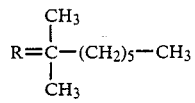

After a few minutes, the oil layer became increasingly viscous. After approximately one hour, the oil layer could be removed from the water surface as a tough, dry, non-tacky skin containing 80% wt oil.

EXAMPLE 2

100 g of an oil/water mousse containing 85% water was placed in a glass beaker and 25 g of the maleinised polybutadiene concentrate of Example 1 was stirred in by hand. This was followed by the further addition of 8.2 g of a 25% solution of the basic zinc versatate/diethanolamine complex of Example 1 in toluene, again with hand stirring. The mousse gelled into a rubbery, non-wetting lump within one hour.

EXAMPLE 3

100 g of 3500 seconds heavy fuel oil was placed in a glass beaker and 20 g of a 50% solution in gas oil of the maleinised polybutadiene of Example 1 was stirred in by hand. On completion of the mixing, 3.3 g of a 50% solution of the basic zinc versatate/diethanolamine complex of Example 1 in gas oil was stirred by hand into the polymer/fuel oil solution.

After approximately one hour the oil had gelled into a rubbery, non-wetting lump.

EXAMPLE 4

In this example, the maleinised polybutadiene was Lithene LX16 having a molecular weight of 8000 and 10% wt maleinisation. It was used in the form of a 50% wt solution in toluene. The zinc versatate/diethanolamine was as in Example 1.

The rate of gellation of various crude oils and a heavy fuel oil was measured when the oils were mixed with 10% wt of maleinised polybutadiene and the stoichiometric amount of complex.

The results are shown in Table 1 below.

TABLE 1

| Oil Type | Time to reach Viscosity of 500 Poise (mins) |
|---|---|
| Forcardos | 5.0 |
| Forties | 5.0 |
| Iran Light | 6.5 |
| Iran Heavy | 6.0 |
| Kuwait Export | 6.0 |
| Nigerian Light | 5.0 |
| Heavy Fuel Oil | 2.5 |

The viscosities were measured with a Brookfield LVF Viscometer with spindle 4 at 12 rpm. 60 ml of polymer solution and oil were allowed to reach 25° C. in a thermostated water bath. The cross-linking agent was quickly stirred in within 5 secs and the viscometer spindle lowered into the gelling solution. The time for the viscosity to reach 500 poise was recorded, this being the maximum scale deflection of the viscometer.

EXAMPLE 5

In this example the maleinised polybutadiene was that used in Example 2 and various cross-linking agents were used to determine their ability to cause rapid gellation of a crude oil. 10% wt of maleinised polybutadiene was mixed with Forties crude oil and the stoichiometric amount of cross-linking agent, and the time taken for the mixture to gel to a viscosity of 500 poise at 25° C. was measured as in Example 4. The results are shown in Table 2 below.

TABLE 2

| Cross-linking agent (added in stoichiometric amount to polymer) | Time for solution to reach viscosity of 500 poise (mins) |
| --- | --- |
| 1. Diethanolamine | Insoluble - no reaction |
| 2. Diethylenetriamine | Insoluble - no reaction |
| 3. N—Butylamine | $7.0 \times 10^3$ only slight increase in viscosity |
| 4. Di N—Butylamine | $7.0 \times 10^3$ only slight increase in viscosity |
| 5. N—Methyldiethanolamine | $1.4 \times 10^3$ |
| 6. N,N—Dimethylethanolamine | $7.0 \times 10^3$ |
| 7. $Zn_4O(Versatate)_6/NH(C_2H_4OH)_2$ (1:4) | 5.0 |
| 8. Poly(isobutene) diethylenetriamine | 1.3 |
| 9 Poly(isobutene)2(2 aminoethylamino) ethanol | 31.0 |
| 10. Tetraethylenepentamine microemulsion | 25.0 |
| 11. Diethylenetriamine microemulsion | 1.0 |
| 12. Diethanolamine micro-emulsion | 61.3 |
| 13. Diethylenetriamine in ethoxy ethyl acetate | <30 seconds |

Table 2 shows that there was no or very slow gellation using simple oil-insoluble amines or alkanolamines (experiments 1 to 6). When the amines were solubilised by methods (i), (ii) or (iii) described earlier, gellation occurred within an hour and sometimes within a matter of minutes.

Experiment 7 used method (i).

Experiments 8 and 9 used method (ii). The polyisobutenes used were those sold by BP Chemicals Limited under the registered trade mark Hyvis. For Experiment 8 the Hyvis was Hyvis 07 (440 molecular weight) and for Experiment 9 Hyvis 30 (1300 molecular weight).

Experiments 10, 11, 12 and 13 used method (iii). The microemulsions of Experiments 10, 11 and 12 had the following compositions:

|  | 10 | 11 | 12 |
| --- | --- | --- | --- |
|  | Tetraethylene pentamine | Diethylene triamine | Diethanol-amine |
| Amine | 11.2% wt | 6.2% wt | 6.3% wt |
| Nonyl phenol | 11.0% wt | 13.2% wt | 13.2% wt |
| Oleic acid | 14.2% wt | 17.0% wt | 17.0% wt |
| Lubricating base oil of 95 cS at 40° C. and 75 VI | 63.6% wt | 63.6% wt | 63.5% wt |

The micro-emulsions were formed by dissolving the nonyl phenol and oleic acid in the oil with stirring at ambient temperature and then dispersing the amine also with stirring at ambient temperature.

In Experiment 13, the diethylenetriamine was in the form of a 10% wt solution in ethoxy ethyl acetate.

EXAMPLE 6

Example 5 was repeated using a variety of neutral and basic metal carboxylates as cross-linking agents. The results are shown in Table 3 below.

TABLE 3

| Cross-linking agent (added in stoichiometric amount polymer) | Time for solution to reach viscosity of 500 poise (mins) |
| --- | --- |
| $Zn_4O(Versatate)_6/$ Diethanolamine$_4$ | 5.0 |
| $Mg_4O(Versatate)_6/$ Diethanolamine$_4$ | 22.0 |
| $Cd_4O(Versatate)_6/$ Diethanolamine$_4$ | 31.0 |
| $Zn(Oleate)_2/$ Diethanolamine$_4$ | 31.3 |
| $Pb(Versatate)_2/$ Diethanolamine$_4$ | 6.5 |
| $Ca(Versatate)_2/$ Diethanolamine$_4$ | 21.5 |

The table shows relatively rapid gellation with all these cross-linking agents. The first three agents were basic carboxylate-amine complexes and the last three neutral carboxylate-amine complexes, but all had an amine:carboxylate ratio of 4:1.

EXAMPLE 7

Example 5 was repeated, but using a 200° to 300° C. boiling range gas oil rather than Forties crude oil as the oil to be gelled. The cross-linking agents used were basic zinc versatate/diethanolamine complexes with amine:basic salt mole ratios of from 1:1 to 8:1. The results are shown in Table 4 below.

TABLE 4

| Ratio of Basic Zinc Versatate to Diethanol-amine $Zn_4(V)_6O$:$NH(C_2H_4OH)_2$ | Weight of Cross-linking Agent added as 50% w/w in Toluene (g) | Weight of Toluene added to give constant Dilution Factor (g) | Time for Solution to reach Viscosity of 500 poise (mins) |
| --- | --- | --- | --- |
| 1:1 | 8.57 | — | 29.0 |
| 1:2 | 4.61 | 2.0 | 21.5 |
| 1:3 | 3.28 | 2.7 | 19.0 |
| 1:4 | 2.62 | 3.0 | 15.0 |
| 1:5 | 2.23 | 3.2 | 14.7 |
| 1:6 | 1.96 | 3.3 | 14.8 |
| 1:7 | 1.77 | 3.5 | 16.0 |
| 1:8 | 1.63 | 3.5 | 17.5 |

The table shows that all the complexes gave relatively rapid gellation but with an optimum at amine:-basic salt mole ratios of from 4–6:1.

EXAMPLE 8

Example 5 was repeated using various cross-linking agents to determine their ability to gel crude oil. The results are shown in Table 5 below.

TABLE 5

| Cross-linking Agent (added in Stoichiometric Amount to Polymer) | Time for Solution to Reach Viscosity of 500 poise |
| --- | --- |
| A. Zn$_4$O(Versatate)$_6$ | 17 hours |
| B. Isophorone diamine/cyclohexanone ketimine + water | 1.0 mins |
| C. Ethanolamine/cyclohexanone ketimine + water | 1.0 mins |
| D. Ethanolamine/cyclohexanone ketimine | 36 hours |
| E. Diamino propane/cyclohexanone ketimine + water | 1.5 mins |
| F. Dihydroxy poly(butadiene) | Slight viscosity increase after 72 hours |
| G. Dihydroxy poly(butadiene) + trace triethylamine | 72 hours |
| H. Pentane 1,5 diol | Slight viscosity increase after 500 hours |
| I. Pentane 1,5 diol + trace triethylamine | 500 hours |
| J. Triethylamine | No viscosity increase after 500 hours |

Taking the experiments in order, experiment A shows that basic zinc versatate will cross-link with maleinised polybutadiene on its own, but only slowly.

Experiments B, C, D and E show that ketimines are also effective as cross-linking agents, acting rapidly in the presence of added water (Experiments B, C and E) but only slowly in its absence, (Experiment D). The water acts to hydrolyse the ketimine to ketone+primary amine. In Experiment D, it is presumed that the ketimine was slowly hydrolysed by atmospheric moisture. The use of ketimines thus give the possibility of controlling the rate of cross-linking by controlling the amount of water present and hence the rate of hydrolysis.

Experiments F and J show that diols such as dihydroxy poly(butadiene) and pentane-1,5,diol cross-link only very slowly. The rate of cross-linking may be accelerated by a trace of triethylamine even though triethylamine of itself is inactive. The rate of cross-linking, even with the amine catalysed diols is still, however, slow as compared with oil-soluble mine or alkanolamine cross-linking agents.

EXAMPLE 9

1 liter of Forties crude oil was poured on to the top of a layer of dry sand in a glass tank. The tank was 30 cm×60 cm and the layer of sand was 10 cm deep. The oil quickly fouled the sand and could not be removed from it without entraining large quantities of sand. It remained oily and quickly permeated through the layer polluting more and more sand to greater depths.

The experiment was repeated with fresh clean dry sand. The upper surface of the layer of dry sand was first treated with functionalised polymer and cross-linking agent. 40% w/w 10 parts maleinised poly(butadiene) in white spirit/toluene (1:2) and 25% basic zinc versatate/diethanolamine (1:4) in white spirit were contained in two pressurised cylinders and metered together at a common nozzle at the stoichiometric ratio. The resulting sheet of liquid was allowed to fall into the sand and form an even layer of gel approximately 1 cm thick over the sand's surface. After 15 minutes 1 liter of Forties crude oil was poured onto the gel layer and was prevented from penetrating the sand for over 2 days.

The example illustrates that pollution of beaches, etc. may be minimised by forming a mat of cross-linked polymer on the surface of the sand. Permeation of the sand by oil coming ashore is thereby prevented. In the case of a oil contaminated beach the mat can still be formed and further pollution by additional quantities of oil coming ashore can be prevented.

EXAMPLE 10

In this example, a similar technique to that of Example 5 was used except that the polymer rather than the cross-linking agent was varied.

Thus 10% wt of various maleinised polymers were mixed with Forties crude oil and the stoichiometric amount of a 1:4 basic zinc versatate/diethanolamine complex at 25° C. and the time to gel to a viscosity of 500 poise measured in a Brookfield LVF viscometer with spindle 4 at 12 rpm.

The results are shown in Table 6 below.

TABLE 6

| Polymer | ~molecular weight (MW) | Parts maleinisation (% w/w) | Concentration of polymer (%) | Time to reach viscosity of 500 poise |
| --- | --- | --- | --- | --- |
| Poly(butadiene) | 8,000 | 10 | 10 | 5.0 mins |
| Hydrogenated Poly (butadiene) | 8,000 | 10 | 10 | 20.0 mins |
| Poly(butadiene) | 17,000 | 7.5 | 5 | 3 hours |
| Poly(isoprene) | 300,000 | <10 | 15 | <10 secs |
| Poly(isoprene) | 300,000 | <10 | 10 | <10 secs |
| Poly(isoprene) | 300,000 | <10 | 5 | 30 secs |
| Natural rubber | 1-2 × 10$^6$ | <10 | 5 | 30 mins |
| Ethylene/propylene/ 1,4-hexadiene ter polymer (Nordel 1320) | 300,000 | <10 | 5 | <1 min |

Table 6 shows that there was relatively rapid gellation with a variety of polymers of widely differing molecular weights.

EXAMPLE 11

Example 10 was repeated using further maleinised polymers, but with the polymers dissolved in toluene rather than Forties crude oil.

The results are shown in Table 7 below.

TABLE 7

| Polymer | ~molecular weight (MW) | Parts maleinisation (% w/w) | Concentration of polymer (%) | Time to reach viscosity of 500 poise |
|---|---|---|---|---|
| Poly(butadiene) | 5,000 | 7.5 | 10 | 4 days |
| Poly(butadiene) | 8,000 | 10 | 10 | 10 min |
| Poly(butadiene) | 8,000 | 7.5 | 10 | 16 min |
| Poly(butadiene) | 9,000 | 7.5 | 10 | 8 min |
| Poly(butadiene) | 10,000 | 7.5 | 10 | 8 min |
| Poly(butadiene) | 17,000 | 7.5 | 10 | 3 min |
| Poly(chloroprene) | 500,000 | <10 | 15 | 30 min |
| Linseed oil | 300 | ~50 | 20 | 16 hours |
| Soya bean oil | 300 | ~50 | 20 | 16 hours |
| Tung oil | 300 | ~50 | 20 | 16 hours |
| Poly(butadiene)/soya bean oil copolymer | 2,000 | ~10 | 20 | 16 hours |
| Ethylene/propylene/ethylidene norbonene ter polymer | 300,000 | <10 | 5 | 7 mins |
| Poly(isoprene) | 300,000 | <10 | 2 | 2 hours |

Examples 10 and 11, besides illustrating the wide range of polymers that may be used, also illustrate the effect of varying the molecular weight, extent of maleinisation and concentration of the polymer.

In general gellation time decreases with increase in the molecular weight of the polymer, this being shown particularly by the series of polybutadienes of increasing molecular weight. Other things being equal, increasing the extent of maleinisation also decreases gellation time, although with the very low molecular weight polymers such as the natural oils, even a high degree of maleinisation will not compensate very much. Increasing the concentration of polymer also decreases gellation time, as illustrated by the results with polyisoprene. As a further illustration of this although polybutadiene of 5000 MW had a gellation time of 4 days at 10% concentration, the gellation time was reduced to 1 hour by doubling the concentration to 20%.

EXAMPLE 12

The suitability of various other functionalised polymers and cross-linking agents were tested using the technique of Example 11 (i.e. with the polymers dissolved in toluene).

The results are shown in Table 8 below.

TABLE 8

| Polymer | Cross-linking agent in stoichiometric amount | % w/w polymer in toluene | Time to reach viscosity of 500 poise |
|---|---|---|---|
| Poly(butadiene) 10 pts maleinised (MW8000) | Poly(ethylene imine) MW300 | 10 | <10 sec |
| Poly(butadiene) 10 pts maleinised (MW8000) | Basic zinc versatate complex of above (Zn:N) 1:4 | 10 | <1 min |
| Poly(butadiene) 10 pts maleinised half esterified with methanol | Hexamethylene diisocyanate | 10 | 3 days |
| Poly(butadiene) (MW3000) hydroxy-terminated | Hexamethylene diisocyanate | 20 | 4 days |
| Poly(t-butyl styrene-co-acrylic acid) | Basic zinc versatate/diethylene triamine (1:4) | 4 | 1 min |
| Poly(acryloyl chloride-co-decyl acrylate) | Poly(ethylene imine) | 30 | 1 min |
| Poly(octadecene-1-co-maleic anhydride (1:1) | Poly(ethylene imine)/zinc versatate (Zn:N = 1:4) | 20 | 1 min |

Table 8 shows that poly(ethylene imine) as such or as a complex with basic zinc versatate gave rapid gellation with maleinised polybutadiene, but that hexamethylene diisocyanate gave a very slow reaction with half-esterified or hydroxy-terminated polybutadiene.

Rapid gellation was also achieved with two acrylic copolymers and an octadiene-maleic anhydride copolymer.

EXAMPLE 13

This example shows the gellation of crude oil in the form of an oil slick on salt water.

30 liters of Forties crude oil was poured onto salt water contained in a tank (approximately 3 meter×1 meter surface area) to form a slick approximately 1 cm thick. The oil was sprayed with polymer concentrate (50% w/w 10 parts maleinised poly(butadiene) in white spirit/toluene 1:2) and cross-linking agent (basic zinc versatate/diethanolamine 1:4, 50% w/w in white spirit) from separate nozzles mounted on an air-powered trolley which advanced over the oil at a constant speed such that 7.5 liters of polymer concentrate and 1.2 liters of cross-linking concentrate were evenly applied to the oil in one pass. Mixing was aided by dragging a section of wire mesh (approximately 1 cm mesh) through the treated oil immediately after the spraying. After one hour the oil had been trapped in a three-dimensional polymer network to form a rubbery solid which would easily be removed from the water surface with a coarse meshed net (approximately 2.5 cm mesh). In this way >99% of the oil was removed.

The final gelled product contained approximately 10% polymer cross-linked with the stoichiometric amount of cross-linking agent, the remainder being crude oil.

EXAMPLE 14

This example shows the gellation of a lubricating oil spilt on solid surfaces.

10 g of a lubricating base oil having a viscosity of 30 cS at 40° C. and a viscosity index of 100 were poured onto a piece of PVC sheet and allowed to spread to a thin film. The oil was sprayed with a 30% solution of 10 parts maleinised poly(butadiene) in diisobutyl ketone (10 g even distribution) and a 25% solution of basic zinc versatate/diethanolamine (1:4) in white spirit (4.5 g, 150% stoichiometric amount). After 30 minutes the gelled oil was peeled as a thin skin from the PVC sheet. The skin of oil contained approximately 12% polymer by weight.

A similar experiment was carried out on a larger scale in a metal tray using a 40% polymer solution in white spirit/toluene (1:2) and cross-linking agent as before.

The quantities of reactants were thus:
100 g lubricating oil
75 g polymer solution (40% wt)
45 g cross-linking agent solution (25% wt)

Again, the gelled oil could be peeled off from the metal sheet as a skin after 30 minutes. The skin contained 13.6% wt of polymer.

EXAMPLE 15

The example shows the gellation of organic materials other than heavy petroleum fractions. Samples of 10% wt maleinised poly(butadiene) (8000 MW) were dissolved in various organic solvents to give 10% wt solutions of the polymer and the gellation time determined using the cross-linking agent and technique of Example 4.

The results are shown in Table 9 below.

| Solvent | Time to reach viscosity of 500 poise (mins) |
|---|---|
| Chloroform | 3 |
| Carbon tetrachloride | 3 |
| Halogenated waste product from vinyl chloride manufacture | 35 |
| Diisobutyl ketone | 6 |
| Butoxy ethyl acetate | 3 |
| Tetrahydrofuran | 120 |
| Anisole | 100 |
| 1,4-dioxan | 100 |
| Cyclohexane | 5 |
| Benzene | 8 |
| Toluene | 10 |
| Gas oil | 12 |
| Gasoline | 6 |

In all cases the solvents were totally encapsulated in the cross-linked polymer.

The table shows the ability of the present invention to encapsulate halogenated hydrocarbons, esters, ethers (albeit somewhat more slowly), light hydrocarbons, and light petroleum fractions such as gasoline.

We claim:

1. A method of encapsulating a liquid organic material to reduce hazard or pollution risk said organic material selected from the group consisting of hydrocarbons, halogenated hydrocarbons, organo phosphates, silicones, esters and ethers said method comprising adding to and mixing with said organic material a liquid polymer miscible with the organic material and containing functional groups, which functional groups are carboxylic acid, anhydride or acid chloride groups and reacting with said liquid polymer in the presence of said organic material a cross-linking agent, also miscible with the organic material and containing complementary functional groups which complementary functional groups are primary or secondary amine groups or alcohol groups, the aforementioned reactants being capable of forming a three dimensional network within an hour at ambient temperatures and allowing a three dimensional polymer network containing encapsulated organic material to form a relatively solid handleable substance thereby rendering the organic material more tractable or innocuous.

2. A method according to claim 1 wherein the organic material is selected from the group consisting of chloroform, carbon tetrachloride halogenated waste product from vinyl chloride manufacture, diisobutyl ketone,, butoxy ethyl acetate, tetrahydrofuran, anisole, 1,4-dioxan, cyclohexane, benzene, toluene, gas oil and gasoline.

3. A method according to claim 1 wherein the cross-linking agent contains, as complementary functional groups, primary amine groups.

4. A method according to claim 1 wherein the cross-linking agent contains, as complementary functional groups, secondary amine groups.

5. A method of encapsulating a liquid organic material to reduce hazard or pollution risk, said organic material selected from the group consisting of hydrocarbons, halogenated hydrocarbons, organo phosphates, silicones, esters and ethers, said method comprising adding to and mixing with said organic material, a liquid polymer, miscible with the organic material and containing functional groups, which functional groups are primary or secondary amine groups or alcohol groups, and reacting with such liquid polymer in the presence of said organic material, a cross-linking agent, also miscible with the organic material and containing complementary functional groups, which complementary functional groups are carboxylic acid, anhydride or acid chloride groups, the aforementioned reactants being capable of forming a three dimensional network within an hour at ambient temperatures and allowing a three dimensional polymer network containing encapsulated organic material to form a relatively soid, handleable substance thereby rendering the organic material more tractable or innocuous.

6. A method according to claim 5 wherein the organic material is selected from the group consisting of chloroform, carbon tetrachloride, halgoenated waste product from vinyl chloride manufacture, diisobutyl ketone, butoxy ethyl acetate, tetrahydrofuran, anisole, 1,4-dioxan, cyclohexane, benzene, toluene, gas oil and gasoline.

7. A method according to claim 5 wherein the liquid polymer contains primary amine groups.

8. A method according to claim 5 wherein the liquid polymer contains secondary amine groups.

9. A method as claimed in claim 1 or 5 wherein the organic liquid is a hydrocarbon.

10. A method as claimed in claim 1 or 5 wherein the hydrocarbon is an oil.

11. A method as claimed in claim 1 or 5 wherein the functionalized polymer and cross-linking agent are added in a molar ratio of 3:1 to 1:3, based on the molar ratio of functional groups in the polymer and agent.

12. A method as claimed in claim 1 or 5 wherein the polymer and cross-linking agent are soluble in the organic material.

13. A method as claimed in claim 1 or 5 wherein the amount of functionalized polymer is from 0.1 to 30% wt of the organic material.

14. A method as claimed in claim 13 wherein the organic material is spilled oil and the amount of functionalized polymer is from 2 to 15 percent wt of the oil.

15. A method as claimed in claim 1 or 5 wherein the functionalized liquid polymer is a polyolefin.

16. A method as claimed in claim 1 or 5 wherein the functionalized polymer is maleinized polybutadiene, polyisoprene, EPDM rubber or natural rubber.

17. A method as claimed in claim 1 or 5 wherein the cross-linking agent is rendered soluble in the organic material by complexing with a metal carboxylate.

18. A method as claimed in claim 17 wherein the metal carboxylate is a basic zinc salt of general formula $(RCCO)_6Zn_4O$ where R is alkyl, cycloalkyl, aryl aralkyl or alkaryl.

19. A method as claimed in claim 1 or 5 wherein the cross-linking agent is rendered soluble in organic material by including in the agent a hydrocarbyl group having at least 8 carbon atoms.

20. A method as claimed in claim 19 wherein the hydrocarbyl group is a polyisobutylene group.

21. A method as claimed in claim 1 or 5 wherein the cross-linking agent is dispersed or dissolved in a diluent or solvent which is itself soluble in the organic material.

22. A method as claimed in claim 1 or 5 wherein the functionalized polymer and the cross-linking agent have a viscosity of up to 20 poise at 25° C.

23. A method of recovering organic material from a substrate comprising encapsulating the organic material according to the method of claim 1 or 5 and recovering the three dimensional polymer network containing the encapsulated organic material from the substrate.

24. A method recovering organic material from a substrate according to claim 23 wherein the substrate is a solid substrate.

25. A method of recovering organic material from a substrate according to claim 23 wherein the substrate is water.

26. A method of recovering organic material from a substrate according to claim 25 wherein the three dimensional polymer network containing encapsulated organic material is recovered from the water using a net.

27. A method of recovering organic material from a substrate according to claim 23 wherein the organic material is a crude oil or a petroleum fraction.

28. A method of recovering organic material from a substrate according to claim 23 wherein the three dimensional polymer network containing encapsulated organic material is recovered from the substrate using solids handling equipment.

29. A method of stopping a leakage of an organic material from a tank or a pipeline comprising encapsulating the organic material in the vicinity of the leak according to the method of claim 1 or 5.

30. A method of stopping a leakage of an organic material from a pipeline comprising encapsulating organic material according to the method of claim 1 or claim 5, on each side of the leak to form a plug of the three dimensional polymer network containing encapsulated organic material on each side of the leak.

* * * * *

UNITED STATES PATENT AND TRADEMARK OFFICE
CERTIFICATE OF CORRECTION

PATENT NO. : 4,497,663

DATED : February 5, 1985

INVENTOR(S) : Robert G. Fisher; Ian G. Meldrum; Alan J. Plomer and Richard A. Robinson It is certified that error appears in the above-identified patent and that said Letters Patent is hereby corrected as shown below:

Column 1, line 37, "split" should be --spilt--.

Column 4, line 34, "sinc" should be --zinc--.

Column 6, line 64, "polmer" should be --polymer--.

Column 6, line 62, "masss" should be --mass--.

Column 16, line 44, "soid" should be --solid--.

Column 16, line 49, "halgoenated" should be --halogenated--.

Signed and Sealed this

Sixth Day of August 1985

[SEAL]

Attest:

DONALD J. QUIGG

Attesting Officer

Acting Commissioner of Patents and Trademarks